United States Patent Office 3,348,525
Patented Oct. 24, 1967

3,348,525
CONTAINER GUMMING APPARATUS
Michael Zwarycz, Wilbraham, and Charles A. Dumas, Westfield, Mass., assignors to United States Envelope Company, Springfield, Mass., a corporation of Maine
Filed May 18, 1965, Ser. No. 456,721
6 Claims. (Cl. 118—220)

ABSTRACT OF THE DISCLOSURE

A means for applying spots of glue to bottles or other generally cylindrical articles moved in a single line by a conveyor includes a turret rotatable about an axis parallel to the axes of the articles. Carried on the turret in angularly spaced relation are a plurality of gum applicators rotatable about axes generally parallel to the articles and biased outwardly toward the articles. As the articles are advanced by the conveyor each one engages a gum applicator and moves it to rotate the turret and to bring the next applicator into position for engagement by the next article. As the turret is so rotated other gum applicators are brought into contact with a gum pick-up member to receive a fresh charge of glue.

---

Figure 1:
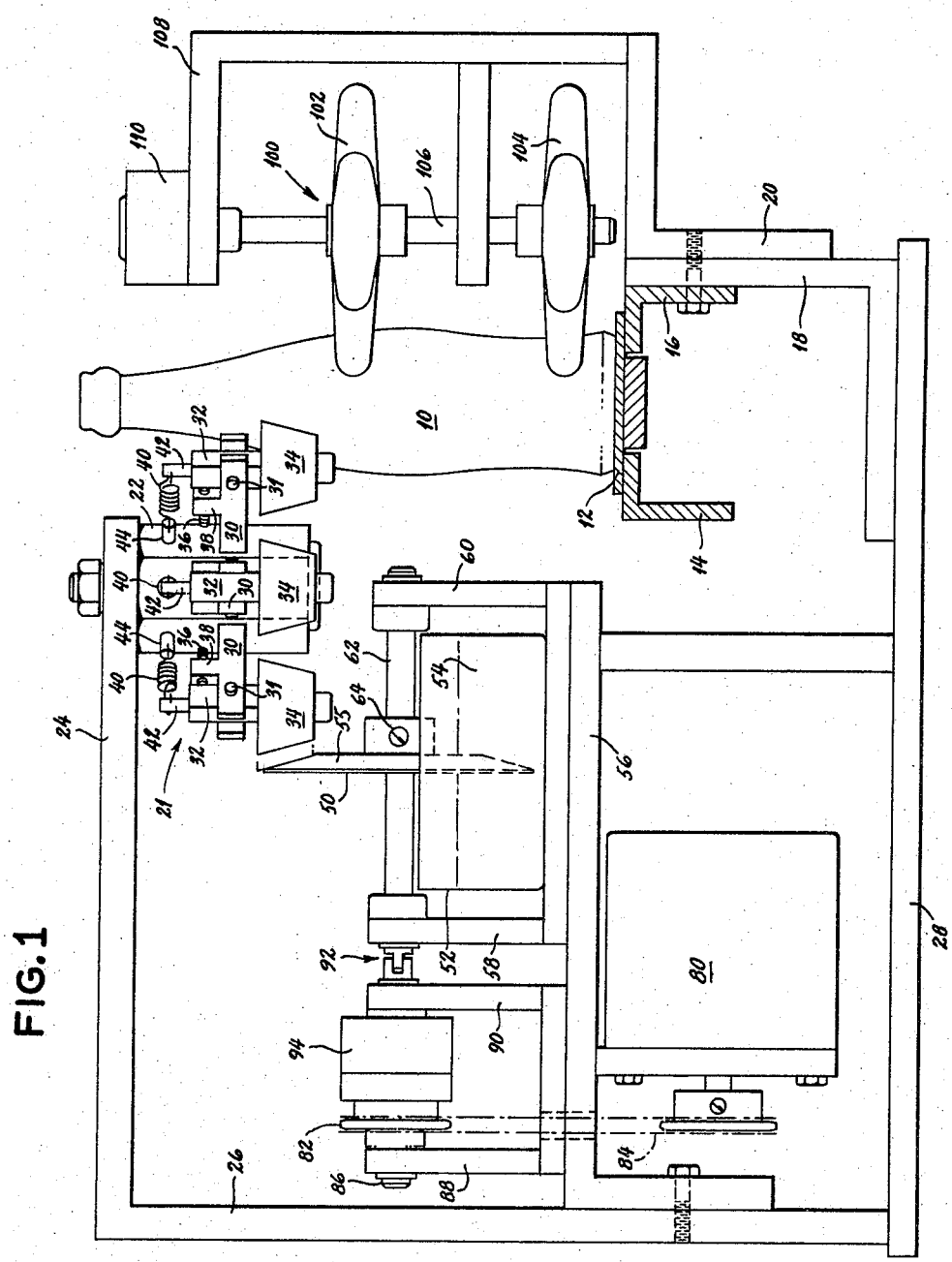

This invention relates generally to apparatus for gumming containers such as bottles, and more specifically, this invention relates to apparatus for automatically applying gum to the surface of containers as they are moved along by a conveyor.

It is common practice to apply labels, collars, or the like to the surface of containers for carrying certain information, advertising, or decorative matter. Prior to such application, it is necessary to provide gum on either the collars or labels, or the containers to which they are to be applied. The term "label" as herein used is intended to be sufficiently broad to include "collar." When preformed collars are used, it is very difficult, if not impossible, as a practical matter, to apply the gum to the inside of the collars. Hence, where pre-formed collars are to be applied to the containers, it is practically essential that the gum be applied to the container rather than to the collar, thereby deviating from the practice heretofore followed of applying the gum to the label.

It is an object of the present invention to provide an apparatus for applying gum to containers, more especially bottles, as they are advanced by a conveyor.

It is a further object of this invention to provide a container gumming apparatus wherein the containers themselves actuate the gumming apparatus in passing, thereby insuring that every container will have an application of gum, and that no gum is wasted.

It is still a further object of this invention to provide an extremely simple and versatile apparatus for accomplishing the desired result.

With the above and further objects in view, the invention comprises the several steps, sequences, devices, combinations, and arrangements of parts hereinafter set forth and illustrated in the accompanying drawings, from which the several features of the invention and the advantages attained thereby will be readily understood.

Figure 2:
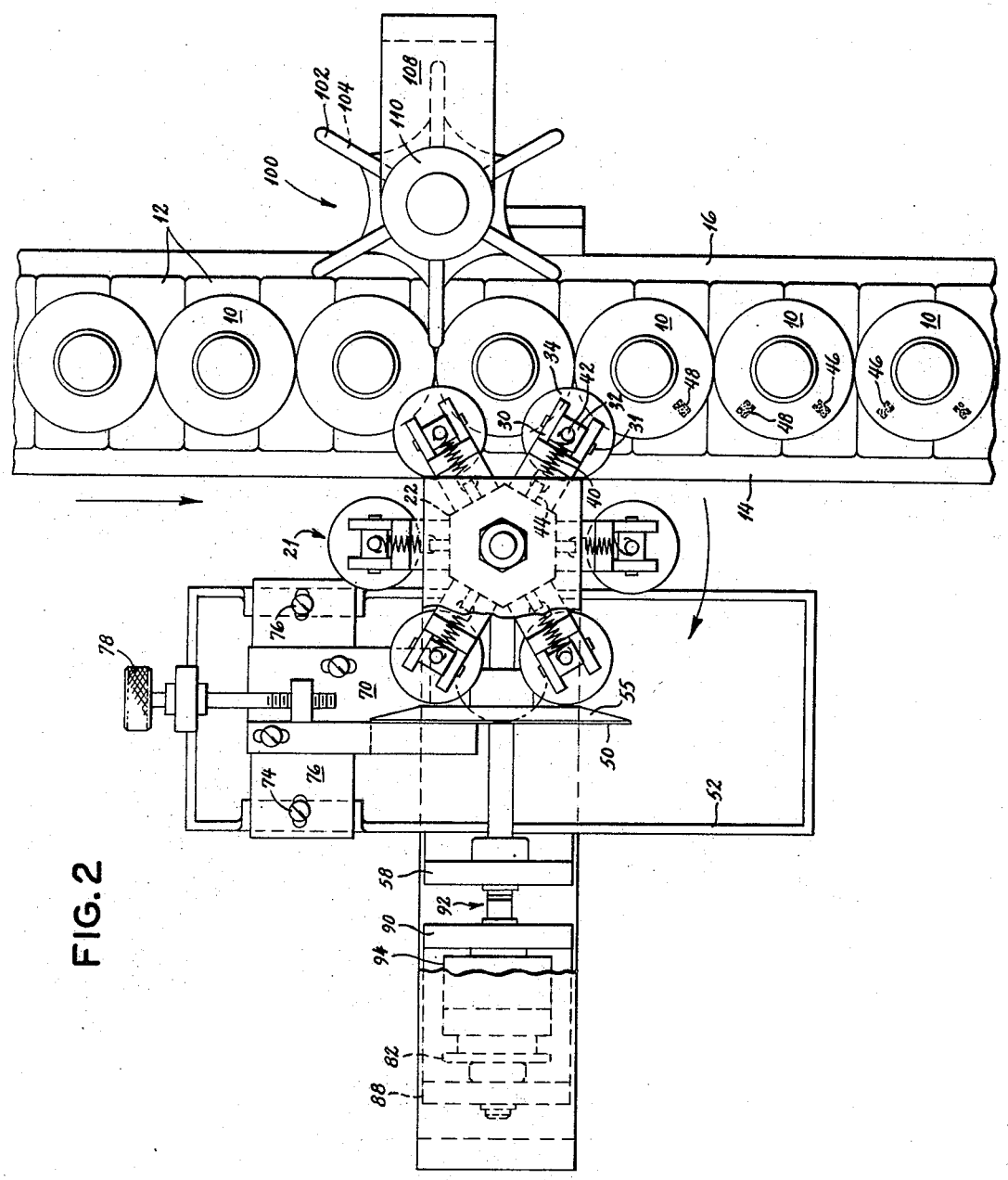

In the drawings:

FIGURE 1 is an elevation view of the gumming apparatus mounted adjacent a bottle conveyor, looking in a direction parallel to the conveyor; and FIGURE 2 is a plan view of the apparatus shown in FIGURE 1.

Referring to the drawings, bottles 10 stand upright on the conveyor 12 which moves in the direction of the arrow shown in FIGURE 2. The conveyor 12 may be of an endless belt type, and runs in a generally straight, substantially horizontal path. Bottles 10 are fed onto the upstream end of the conveyor 12 and are carried thereon by friction. The bottle-carrying reach of conveyor 12 may be supported by the frame members 14 and 16.

The apparatus for applying the gum to the bottles may conveniently be supported from the conveyor frame 14 and 16 by means of the brackets 18 and 20. Preferably, additional means (not shown) for providing support for the apparatus may be used, such as, for example, floor supports.

The gum applying apparatus shown in the drawings is intended to apply gum to the tapered neck portion of the bottles 10 for the adhering thereto of truncated conical collars. It should be understood, however, that the gumming apparatus according to this invention may also be used for applying gum to any part of the side portions of the bottles 10.

The gum applying turret 21 is mounted, by means of hub 22, to the frame piece 24, which in turn is supported by frame members 26 and 28, member 28 being connected to the bracket 18. The hub 22 is mounted in the frame piece 24 for one-way, free rotation in the direction of movement of the bottles 10 on the conveyor 12. Any convenient commercially available one-way rotational hub may be used for this purpose.

The hub 22 is provided with a plurality of radially extending, angularly spaced arms 30. The arms 30 are rigidly attached to the hub 22, and are provided with a U-shaped slot at their ends. Pivotally mounted in said U-shaped slots by means of the pins 31 are the small bars 32, which are provided with the gum applicators 34. The gum applicators 34 are preferably freely spinnable rollers made of, or having a surface covering of a material exhibiting at least some degree of resiliency, such as rubber. The gum applicators 34 used, in this case, for applying gum to the tapered neck portion of bottles, are preferably tapered in relation to the taper of the necks of the bottles 10, to have a maximum of their respective areas in contact.

The pivotal movement of the bars 32 is determined by the set screws 36 mounted in the blocks 38 which are fixed to the arms 30. The springs 40 are connected to the ends of bars 32 by means of the pins 42, and are anchored to the hub 22 by means of the pins 44. The springs 40 tend to hold the bars 32 against the ends of set screws 36 to determine the outermost position of the gum applicators 34. The applicators 34 are therefore free to move radially inward against the action of the springs 40. The outermost radial extent of the applicators 34 is set such that the applicators 34 will contact that portion of the bottles 10 traveling on the conveyor 12 to which gum is to be applied, as shown in the drawings. If desired or found necessary, suitable side rails (not shown) for the conveyor 12 may be provided to guide the bottles 10 along the desired path in passing the turret 21.

The angular spacing and radial extent of the circumferential gum applicators 34 are such that the applicators fall in the groove between adjacent bottles 10, as best shown in FIGURE 2. Therefore, downstream movement of the bottles 10 causes the turret 21 to advance, for each bottle which passes, an amount substantially equal to the angle between the arms 30. By the applicators 34 falling into the groove between adjacent bottles 10, contact is made with two adjacent bottles 10 by each gum applicator 34. Thus, referring to the bottles 10 in FIGURE 2, the spots of gum 46 will be applied to two adjacent bottles 10 by a single applicator 34, while the spots 48 will be applied by the succeeding applicator 34, etc.

Means for applying gum to the applicators 34, for subsequent transfer to the bottles 10, is provided by a gum pick-up disc 50 which rotates at a relatively high speed compared to the speed of rotation of the turret 21. The disc 50 is partially submerged in a tub 52 of gum 54, and is positioned in relation to the path of the applicators 34 such that the applicators 34 contact the surface 55 of disc 50, to thereby pick up a layer of gum. The speed of disc 50 is such that the applicators 34, when they contact the disc 50, will be caused to rotate for substantially at least one revolution to pick up substantially a full surface coating of gum by spinning about their axes.

Gum tub 52 is supported by bracket 56, which is fixed to frame member 26. Bracket 56 also has fixed thereto the upright supports 58 and 60 in which shaft 62 is rotatably mounted. Disc 50 is connected to shaft 62 by means of the set screw 64. For insuring that a proper amount of gum will be carried to the applicators 34 by the disc 50, there is provided a doctor blade 70 slidably attached to the gum box 52 by means of the bar 72. Bar 72 can be adjusted longitudinally of the shaft 62 by means of set screws 74 and 76. The doctor blade 70 can also be adjusted in the direction perpendicular to the shaft 62 by means of the thumbscrew 78.

Shaft 62 is driven by means of motor 80 mounted below the bracket 56. Motor 80 drives pulley 82 by means of belt 84. Pulley 82 is fixed to shaft 86 which is rotatably mounted in the supports 88 and 90. Shaft 86 is connected to shaft 62 by means of coupling 92. Also, a slip clutch 94 is provided on shaft 86 for protecting the motor 80 in case disc 50 should become stuck.

In the event any bottle 10 on the conveyor 12 should tend to tip over backwards upon contacting one of the gum applicators 34, a back-up wheel 100 is provided on the opposite side of the conveyor 12 to help prevent the possibility of such an occurrence. Back-up wheels 100 is provided with a plurality of upper and lower radially extending arms, 102 and 104 respectively, mounted in alignment on shaft 106. Shaft 106 is supported from the bracket 108, and is mounted in a commercially available one way clutch 110 which allows it to spin freely in the direction of movement of the bottles 10. Back-up wheel 100 may conveniently be mounted just upstream from the turret 21, and turns freely under the force exerated on the arms 102 and 104 by bottles 10 moving on conveyor 12. Thus, by the time a bottle 10 contacts one of the gum applicators 34 of turret 21, the bottle 10 is far enough past the back-up wheel 100 to have a pair of aligned arms 102 and 104 firmly behind it. Since the wheel 100 will not turn backwards, a bottle cannot tip over backwards upon contacting one of the gum applicators 34.

It will be understood that various changes in the details, materials, steps, and arrangements of parts, which have been herein described in order to explain the nature of the invention, may be made by those skilled in the art within the scope of the invention as expressed in the appended claims.

I claim:

1. An apparatus for applying gum to generally cylindrical articles moved in a single line with their central axes generally parallel along a given path by an associated conveyor, said apparatus comprising a gum reservoir for receiving a quantity of gum, a gum pick-up member having a central axis of revolution and having a gum pick-up surface surrounding and coaxial with said axis, means supporting said gum pick-up member so that a portion of said gum pick-up surface is located within the body of gum contained in said reservoir and so that another portion thereof is located outside of said body of gum, means for rotating said pick-up member about said axis of revolution, a turret located between said gum pick-up member and said given path, means supporting said turret for rotation about a turret axis arranged generally parallel to said central axes of said articles, a plurality of gum applicators and means supporting said gum applicators on said turret in angularly spaced relation about said turret axis and for rotation about axes generally parallel to said turret axis, said turret being so arranged relative to said conveyor that as said articles are moved along said given path by said conveyor the advancing side of each article engages one of said gum applicators and moves it and said turret about said turret axis to bring the following one of said applicators into position for engagement with and movement by the next of said articles, said turret being further so arranged relative to said gum pick-up member that as said turret is rotated said gum applicators are brought in succession into contact with said portion of said gum pick-up surface located outside of said body of gum and by such contact are spun about their axes to transfer gum from said gum pick-up surface to said applicator, and said means for driving said gum pick-up member being operable to drive said member at a speed sufficient to rotate each of said gum applicators one full revolution about its axis each time it contacts said gum pick-up surface.

2. An apparatus as defined in claim 1 further characterized by said gum pick-up surface of said gum pick-up member being generally frusto-conical in shape and said gum applicators each having a frusto-conical gum pick-up surface engageable with said gum pick-up surface of said gum pick-up member and with said articles.

3. An apparatus as defined in claim 1 further characterized by said gum applicators each having a gum pick-up surface coaxial with its axis of revolution and engageable with said gum pick-up surface of said gum pick-up member and with said articles, said gum pick-up surfaces of said applicators being of such size and said gum applicators being so arranged that as each applicator moves into engagement with the advancing side of one of said articles it also moves into engagement with the retreating side of the preceding article.

4. An apparatus as defined in claim 1 further characterized by means for biasing said gum applicators radially outwardly relative to said turret axis, and means for limiting the radial outward movement of said gum applicators under the influence of said biasing means.

5. An apparatus as defined in claim 4 further characterized by a plurality of support members each rotatably supporting a respective one of said gum applicators, and means pivotally connecting each of said support members to said turret for pivotal movement about an axis tangential to said turret axis, and said means for biasing said gum applicators including a spring associated with each of said support members and biasing said support member in one direction about its pivot axis.

6. An apparatus as defined in claim 1 further characterized by means cooperating with said turret for allowing rotation thereof only in the direction in which it is rotated by its engagement with said articles.

References Cited

UNITED STATES PATENTS

| 1,898,653 | 2/1933 | Bleier | 118—220 X |
| 1,956,820 | 5/1934 | Bergstein | 118—256 X |
| 2,004,944 | 6/1935 | Holloway | 118—220 X |
| 2,911,942 | 11/1959 | Gross | 118—202 |

CHARLES A. WILLMUTH, *Primary Examiner.*

R. I. SMITH, *Assistant Examiner.*